Aug. 11, 1959  L. R. LJUNGBERG ET AL  2,898,802

PHOTOELECTRIC COLORIMETER

Filed Jan. 24, 1956

United States Patent Office 2,898,802
Patented Aug. 11, 1959

2,898,802

PHOTOELECTRIC COLORIMETER

Lars Rune Ljungberg, Stockholm, and
Lars Erik Öhlin, Solna, Sweden

Application January 24, 1956, Serial No. 561,069

5 Claims. (Cl. 88—14)

The present invention relates to an improved photoelectric colorimeter particularly for determining the light absorption of liquids. The main parts of known apparatuses of this kind consist of a source of light, preferably in the form of an electric incandescent lamp, an optical system adapted to direct a ray of substantially parallel light from the light source towards a transparent container for test liquid introduced into a holder or receiver in the apparatus, a photoelectric cell adapted to intercept the light passing through the test liquid container, and an ammeter connected to the photoelectric cell for measuring the current from the cell. Said current is a function of the light intensity reaching the photoelectric cell. If the reading of the ammeter is to be useful as a measure of the light absorption or light transparency of the test liquid, the apparatus must, however, first be calibrated. This is customarily done in such a way that the light intensity of the light source is adjusted at a value giving a full scale reading by the meter, when the container is filled with a clear, colourless liquid, for instance pure water. The same light intensity is then used for measuring standard liquids of different kinds and having different known absorption values. On the basis of the results obtained tables or curves are prepared for the different kinds of liquids, and from each such table or curve the absorption value of an unknown test liquid of a corresponding kind, which is tested in the apparatus can be evaluated.

It is evident from the above that when using the apparatus in practice the first condition for correct results is that during the measuring operations the light intensity of the light source must be constant and equal to that used for calibration. When using an electric incandescent lamp as a light source and feeding the same from the common lighting network the variations in voltage occurring in such networks are, however, too great to satisfy this requirement. Therefore, it has been necessary to continuously check and regulate the light intensity during the tests. This is a cumbersome and time-consuming procedure when using the apparatus so resort is had to other means to eliminate or reduce the variations in voltage as for example, by some kind of voltage stabilizer which, however, is generally rather complicated in order to be sufficiently effective, and therefore makes the apparatus considerably more expensive.

A principal object of the present invention is to eliminate or at least to considerably reduce these drawbacks by a design of the apparatus such that the light intensity can easily and conveniently be controlled before as well as after each test. To this end according to the invention a shutter member is provided which is introducible into the path of light between the light source and the photoelectric cell and has a fixed aperture that only transmits a predetermined fraction of the light falling onto the test liquid container during a testing operation. Preferably the size of the shutter aperture is selected such that the meter reading when illuminating the photoelectric cell through the shutter member is within the range over which the readings vary when the photoelectric cell is illuminated through the liquids to be tested.

According to the invention, the shutter is further conveniently adapted to automatically take up its operative position with the aperture positioned centrally in the path of light, when the test liquid container is taken out of the holder, and preferably is also adapted to be automatically moved in its inoperative position, outside the path of light, when the test liquid container is introduced into the holder. By this arrangement, the shutter will be positioned in the path of light, as soon as the test liquid container is removed from the apparatus after measuring, and a check of the ammeter reading will then immediately disclose whether the light intensity is right as calibrated or if a correction is required followed by a retesting of the sample of liquid being tested.

Another essential difference between the known colorimeters and the invention is associated with the following conditions. When a sample is removed from an apparatus of the known kind the photoelectric cell is subjected to the full light from the light source. In order that the ammeter is not damaged thereby, it must have a measuring range corresponding to this great light intensity which considerably exceeds the light intensity registering on the instrument during the measuring of absorptions. Thus, the measuring range must be increased beyond that which is necessary for determining the light absorption of a sample, which causes a reduced extension of the part of the measuring range used when the sample is placed in the apparatus and thereby makes the readings less accurate. This drawback is eliminated by the shutter according to the invention, as its aperture is selected such that it only transmits a certain fraction of the light illuminating the sample at a measuring. Nor is a certain maximum light intensity giving a full reading by the meter used as a starting point for the calibration of the apparatus according to the invention, but a light intensity reduced by the shutter and adjusted such that the hand of the instrument is positioned on a scale graduation approximately at the middle of the scale or within a range of the scale over which the hand moves at the measurings. Thus, in the apparatus according to the invention the instrument can be constructed for a scale compressed near the maximum reading, whereby a further increase of the scale space for the remaining measuring range is obtained.

Another condition for reliable measuring results is that unavoidable deviations in the characteristics of the photoelectric cell from those prevailing at the calibration have a negligible effect on the current passing through the instrument. The foremost reason for such deviations is the dependence on temperature of the photoelectric cell.

According to the invention, steps have therefore been taken, firstly, to reduce the temperature rise in the apparatus caused by the lamp and, secondly, to compensate the measuring circuit for a reduced rise in temperature of the photoelectric cell.

The first measure consists in providing a switch in the lamp circuit which is actuated to close the circuit only when a test liquid container has been introduced into the holder of the apparatus. Thus, the lamp is lighted only when the light intensity is controlled and an absorption test is performed, and extinguished for a while between each such operation so that the amount of heat generated by the lamp and thereby the rise in temperature of the photoelectric cell are reduced to a minimum.

A compensation of the testing circuit for variations in the temperature of the photoelectric cell is effected, according to the invention, by means of an unilluminated compensation cell that, with reversed polarity, is connected in parallel to the illuminated testing cell and placed close to and preferably in metallic contact with the latter, so that both photoelectric cells get the same temperature. An excellent compensation is obtained, if the two photoelectric cells are substantially identical.

The colour filter introduced into the path of light at many tests may constitute a further source of measuring errors, in that its transmission characteristics may change at great variations in temperature. In order to eliminate errors of this origin as far as possible, the filter is, according to the invention, placed in the path of light behind the pocket and the shutter member, so that it can never be subjected to the full light and heat radiation of the lamp.

For better understanding of the invention reference is made to the following specification of an embodiment shown in the accompanying drawing and in which.

Figure 1:
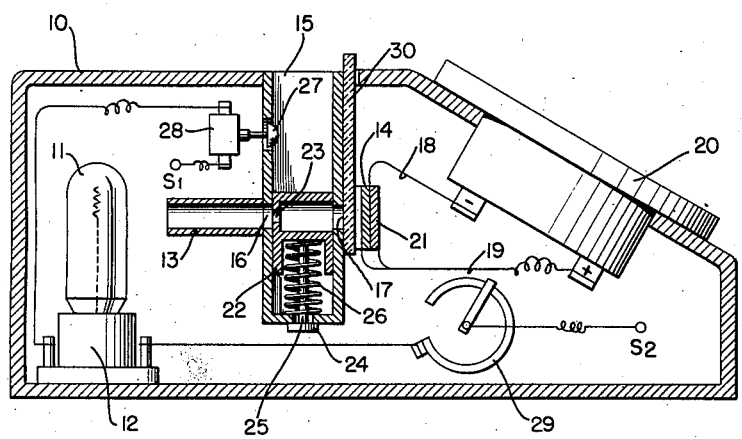
Figure 1 is a diagrammatic longitudinal section through the apparatus.

The apparatus comprises a housing 10, in and on which the various parts are mounted. Within the casing and close to its rear side an incandescent lamp 11 is mounted in a suitable socket 12. A ray of substantially parallel light from the lamp is directed by light-directing means, which in the embodiment shown simply consists of an internally matted or otherwise treated tube 13 to render it anti-reflectional, towards a photoelectric cell 14 fixedly secured in the housing. A test specimen or test sample receiver or holder 15 open at the top and intended to receive test liquid containers extends from the upper side of the housing down between the tube 13 and the photoelectric cell 14. In alignment with the tube 13 apertures 16, 17 are provided in the opposite side walls of the test sample holder, so that the light can pass through the sample to the photoelectric cell. A multi-color light filter 30 is placed beside the sample holder 15 on the side opposite from the lamp 11.

Figure 2:
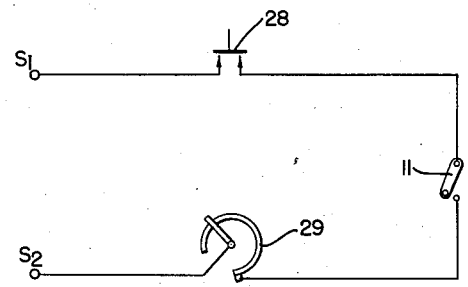
Figures 2 and 3 show circuit diagrams of the lamp circuit and the measuring circuit respectively.
Figure 3:
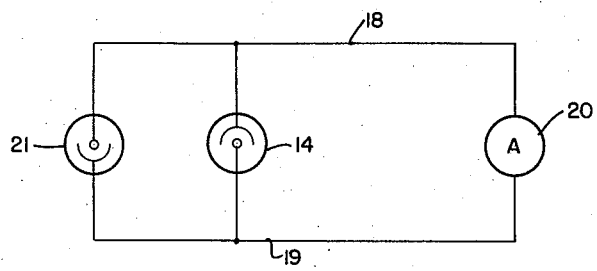

The photoelectric cell 14 is connected, by means of leads 18 and 19 (Fig. 2), to the terminals of an ammeter 20 fitted preferably in an inclined fore portion of the upper side of the housing 10. A compensation cell 21 is arranged preferably in metallic contact with the photoelectric cell 14 and in such a way that it is not struck by the light from the lamp 11. It is seen from Fig. 2 that the compensation cell 21 with reversed polarity is shunted across the photoelectric cell 14.

It has been found that by connecting an unilluminated photocell 21 with reversed polarity across the illuminated photocell 14 a very satisfactory temperature compensation is obtained. This advantageous effect can at least in part be explained as follows: The unilluminated cell function as a shunt resistance of the illuminated cell which constitutes a source of current. The internal resistances of the two cells vary with temperature in the same manner. If, for instance, the resistances increase due to an increase in temperature, then the shunting cell will draw less current with consequential reduction of the total current through the illuminated cell. This decrease of the total current reduces the rise in the voltage drop in the illuminated cell due to the increase of its internal resistance. Thus, comparing the conditions with and without the shunt cell, it will be seen that the shunt cell tends to reduce the variations of the terminal voltage of the illuminated cell due to variations in ambient temperature, that is to say, effects a partial temperature compensation of the meter circuit.

In the embodiment shown, a shutter member 22 with an aperture 23 is slidably mounted inside the sample holder 15. The shutter member is movable between an upper end position in which the shutter aperture 23 is aligned with the openings in the tube 13 and the walls of the holder 15, and a lower end position in which the shutter member is entirely outside the light path to the photoelectric cell 14. The upper end position is determined by a stop 24 engaging the outer face of the bottom of the sample holder 15. The stop 24 is provided with a rod 25 extending downwardly from the shutter member and through the bottom of the sample holder. The lower end position is determined by the shutter member abutting the inner face of the bottom of the holder 15. A helical spring 26 is disposed between the pocket bottom and the shutter member 22 and is adapted to normally hold the shutter member in its upper end position. The upper portion of the shutter member 22 is formed with an upper face which acts as a support on which the bottom of a test liquid container introduced into the test sample holder 15 rests. The aperture 23 in the shutter is smaller than the opening 16 in the side wall of the holder so that only part of the light passing through the tube 13 is transmitted to the photoelectric cell 14, when the shutter is in its upper position. As will be seen, the shutter member may, within the scope of the invention, be movable otherwise than by sliding and it may just as well be arranged outside as inside the sample holder.

An operating member 27 for a switch 28 normally open when not actuated projects into the upper part of the holder 15 through one of the walls as shown. When placing a test liquid container in the holder, this member 27 is pressed outwardly of the holder and thereby closes the switch 28. The switch 28 is in the lamp circuit (see also Fig. 2), so that this circuit is closed and the lamp 11 shines only when a test liquid container is placed in the holder 15. The lamp circuit is connected to the supply network terminals S1 and S2 and contains besides the lamp 11 and the switch 28 a rotary potentiometer 29 for regulating the lamp voltage and thereby the light intensity. At the outside of the housing a knob (not shown) is provided for operating the potentiometer 29.

An absorption test with the duly calibrated apparatus is carried out as follows:

The sample of liquid, the light absorption of which is to be measured, is poured into a test liquid container, preferably in the shape of a specimen container having parallel cuvette sides and giving a definite layer thickness of the sample. The cuvette is placed in the correspondingly formed holder 15 in the apparatus so that it rests on the shutter member 22 which is in its upper end position. By introducing the cuvette, the operating member 27 is pressed outwardly, so that the switch 28 is closed and the lamp 11 is lighted. The photoelectric cell is now illuminated through the shutter aperture 23, and by means of the potentiometer the light intensity of the lamp is adjusted, if necessary, until the ammeter 20 shows the pointer deflection which at the calibration was fixed as the initial value when the shutter controls the amount of light transmitted. By manual pressure downwardly on the cuvette the shutter member 22 is pushed out of, and the cuvette is pushed into, the path of light so that the light instead of passing through the shutter now passes through the cuvette and the test liquid. The reading of the meter then constitutes a measure of the light absorption of the test liquid. After the reading the cuvette is released, whereby the shutter member 22 under the action of the spring 26 automatically returns to its upper rest position with the shutter aperture 23 in the path of light so that the light intensity can again be checked by a glance at the ammeter without removing the cuvette from the pocket 15. The reading of the instrument, the pushing down and release of the cuvette take place in about 5 seconds, so that variations in voltage, if any, are hardly able to affect the result. Should there be a variation in voltage, this is detected upon the release of the cuvette, and after correcting the light intensity the measuring operation is repeated.

We claim:

1. In an improved photoelectric colorimeter for measuring the light absorption characteristics of a specimen of liquid, a source of light rays, light-sensitive means for emitting electrical current as a function of the intensity of light rays falling thereon, means defining a light path for directing a given percentage of the total rays radiated by the source toward the light-sensitive means and for directing the rays substantially parallel, means defining an aperture selectively movable into and out of said light path and adapted to transmit less rays than those transmissible by the light path defining means, means for establishing a datum light intensity while the aperture means is in said light path, means for guiding the aperture means out of the path of light when a liquid specimen is introduced into the colorimeter and into said light path for measuring its light absorption characteristics and for automatically moving the aperture means into the path of the light rays when the specimen is removed, whereby any change in said light datum intensity level is instantaneously ascertainable immediately upon removal of the liquid specimen.

2. In an improved photoelectric colorimeter for measuring the light absorption characteristics of a specimen of liquid, a source of light rays, light-sensitive means for emitting electrical current as a function of the intensity of light rays falling thereon, the light-sensitive means having the characteristic of generating heat as a function of the current emitted thereby becoming less stable and sensitive to the effect of light rays thereon, means defining a light path for directing a given percentage of the total rays radiated by the source toward the light-sensitive means and for directing the rays substantially parallel, means defining an aperture selectively movable into said light path for transmitting a given percentage of the light rays transmissible by the light path defining means, means for establishing a datum light intensity while the aperture means is in said light path, said aperture defining means having a surface for receiving a confined liquid specimen thereon and for supporting the specimen in the light path for measuring its light absorption characteristic, resilient means constantly biasing the aperture defining means into a normal position wherein the aperture is in said light path and adapted to move the aperture out of the path of light when the liquid specimen is introduced into the colorimeter and supported on the aperture defining means and for automatically returning the aperture defining means to its normal position when the liquid specimen is withdrawn whereby the light-sensitive means is automatically subjected to a reduced level of light intensity when no liquid specimen is present in the colorimeter during intermittent measuring of liquid specimens during a sequence of measurements thereby reducing the increases of temperature in said light-sensitive means and greatly increasing the sensitivity and accuracy of the colorimeter.

3. In an improved photoelectric colorimeter according to claim 2, including electrical means for compensating for the temperature rise in said light means thereby increasing the sensitivity and accuracy of the colorimeter.

4. In an improved photoelectric colorimeter according to claim 3, in which said light-sensitive means comprises a first photoelectric cell and said temperature compensating means comprises a second photoelectric cell connected back-to-back in parallel with the first cell, the first cell being positioned to respond to the light rays in said light path and the second cell being disposed in direct physical contact with the first cell and out of the path of the light rays.

5. In an improved photoelectric colorimeter according to claim 2, in which said light-sensitive means comprises a circuit having a photoelectric cell connected to respond to the rays transmissible by the light path defining means and means for automatically electrically energizing the cell when the liquid specimen is introduced into the colorimeter.

References Cited in the file of this patent

UNITED STATES PATENTS

| | | |
|---|---|---|
| 2,233,879 | Tolman | Mar. 4, 1941 |
| 2,265,357 | Demarest | Dec. 9, 1941 |
| 2,483,876 | Boyer | Oct. 4, 1949 |
| 2,677,303 | Marks | May 4, 1954 |
| 2,761,072 | Wormser | Aug. 28, 1956 |

FOREIGN PATENTS

| | | |
|---|---|---|
| 381,696 | Great Britain | Oct. 13, 1932 |
| 594,497 | Great Britain | Nov. 12, 1947 |